US010774758B2

(12) United States Patent
Moik et al.

(10) Patent No.: US 10,774,758 B2
(45) Date of Patent: Sep. 15, 2020

(54) METHOD FOR PRODUCING A COMBUSTION SPACE SIGNAL DATA STREAM WITH INTERFERENCE SUPPRESSION

(71) Applicant: AVL LIST GMBH, Graz (AT)

(72) Inventors: Josef Moik, Graz (AT); Gary Patterson, Clemmons, NC (US)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 16/336,474

(22) PCT Filed: Sep. 28, 2017

(86) PCT No.: PCT/EP2017/074646

§ 371 (c)(1),
(2) Date: Mar. 26, 2019

(87) PCT Pub. No.: WO2018/060339

PCT Pub. Date: Apr. 5, 2018

(65) Prior Publication Data

US 2019/0249610 A1 Aug. 15, 2019

(30) Foreign Application Priority Data

Sep. 28, 2016 (AT) .............................. A 50874/2016

(51) Int. Cl.
*G06F 7/12* (2006.01)
*F02D 35/02* (2006.01)
(Continued)

(52) U.S. Cl.
CPC ........... *F02D 35/028* (2013.01); *F02D 35/02* (2013.01); *F02D 35/023* (2013.01);
(Continued)

(58) Field of Classification Search
CPC .... F02D 19/025; F02D 19/0623; F02D 41/22; F02D 41/24
(Continued)

(56) References Cited

U.S. PATENT DOCUMENTS 4,802,454 A * 2/1989 Tanaka .................. F02P 5/1522
123/406.16
5,722,371 A * 3/1998 Denz ..................... F02D 35/023
123/406.42
(Continued)

FOREIGN PATENT DOCUMENTS

DE 10 2008 004 442 B3 7/2009
DE 10 2008 032 935 A1 1/2010
(Continued)

*Primary Examiner* — John Kwon
(74) *Attorney, Agent, or Firm* — Norman B. Thot

(57) ABSTRACT

A method for producing an output data stream includes picking up and digitalizing a combustion chamber signal to a combustion chamber signal data stream and, simultaneously therewith, picking up and digitalizing a crankshaft angle signal to a crankshaft signal data stream. The combustion chamber signal data stream is split or duplicated into a first and a second combustion chamber signal data flow. The first combustion chamber signal data flow is filtered to a first filtered combustion chamber signal data stream and then transformed to a first transformed combustion chamber signal data stream. The second combustion chamber signal data flow is transformed to a second transformed combustion chamber signal data stream. The first and second transformed combustion chamber signal data streams are combined to an output data stream which comprises the first and second transformed combustion chamber signal data streams in a respective first and second crankshaft angle range.

24 Claims, 1 Drawing Sheet

(51) Int. Cl.
*F02D 41/28* (2006.01)
*F02D 41/14* (2006.01)

(52) U.S. Cl.
CPC ......... *F02D 35/025* (2013.01); *F02D 35/027* (2013.01); *F02D 41/28* (2013.01); *F02D 2041/1432* (2013.01); *F02D 2041/286* (2013.01)

(58) Field of Classification Search
USPC ................................. 701/101, 102, 114, 115
See application file for complete search history.

(56) References Cited

U.S. PATENT DOCUMENTS

| | | | |
|---|---|---|---|
| 2006/0085119 A1 | 4/2006 | Damitz et al. | |
| 2008/0082250 A1 | 4/2008 | Husted et al. | |
| 2009/0182491 A1 | 7/2009 | Bauer et al. | |
| 2010/0307453 A1 | 12/2010 | Buslepp et al. | |
| 2016/0258367 A1* | 9/2016 | Rauscher | F02D 35/024 |

FOREIGN PATENT DOCUMENTS

| | | | |
|---|---|---|---|
| DE | 10 2010 022 518 | A1 | 1/2011 |
| DE | 10 2010 062 394 | A1 | 6/2012 |
| DE | 10 2014 102 440 | A1 | 10/2014 |
| DE | 10 2014 223 070 | A1 | 5/2016 |
| EP | 1 905 989 | A2 | 4/2008 |
| EP | 2 154 506 | A1 | 2/2010 |
| FR | 2 872 282 | A1 | 12/2005 |
| JP | 2005-188297 | A | 7/2005 |
| JP | 2005-531722 | A | 10/2005 |

* cited by examiner

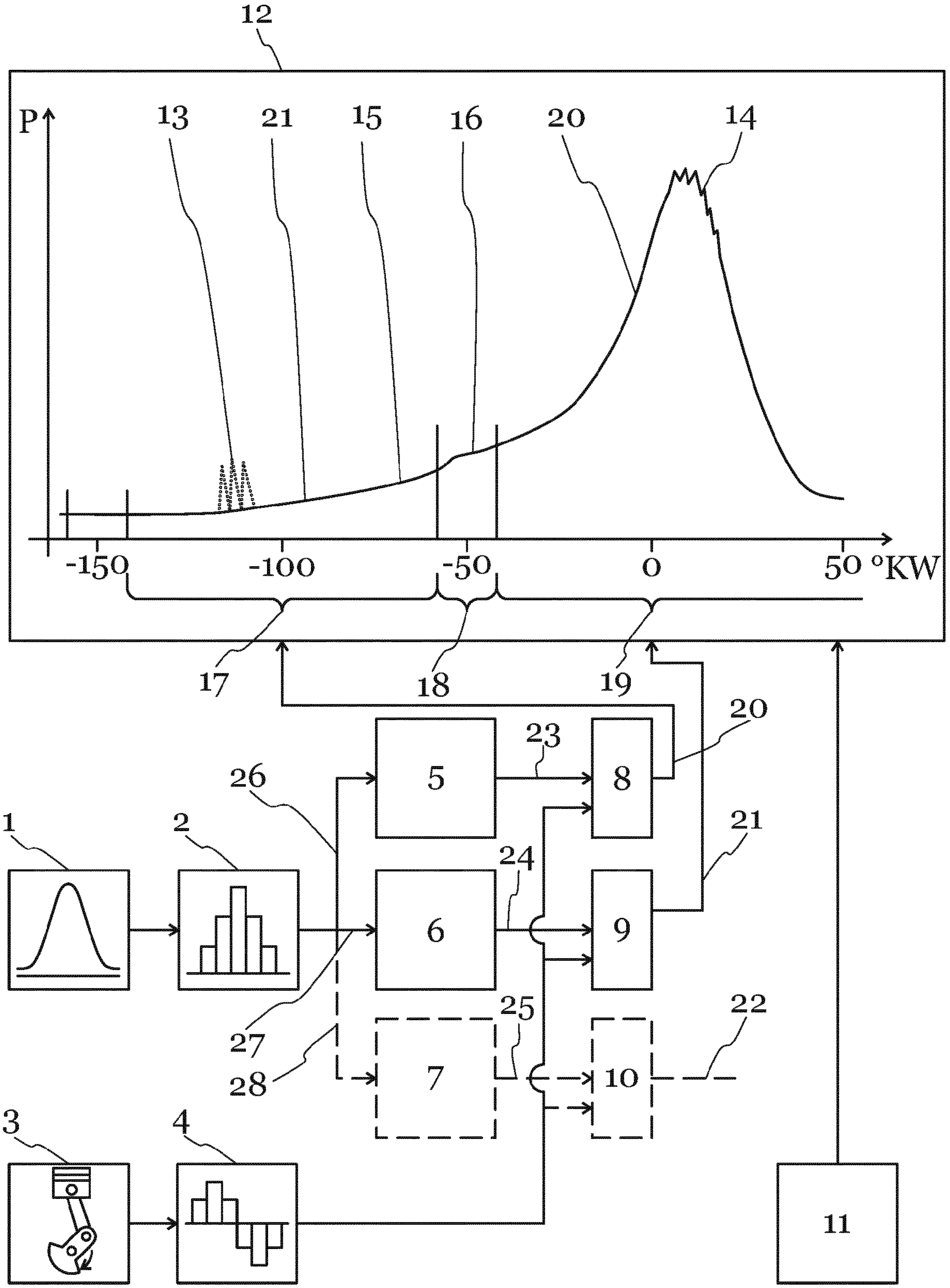
12
P
13
21
15
16
20
14
-150
-100
-50
0
50 °KW
17
18
19
20
23
26
5
8
1
2
24
6
9
21
27
25
22
28
7
10
3
4
11

METHOD FOR PRODUCING A COMBUSTION SPACE SIGNAL DATA STREAM WITH INTERFERENCE SUPPRESSION

CROSS REFERENCE TO PRIOR APPLICATIONS

This application is a U.S. National Phase application under 35 U.S.C. § 371 of International Application No. PCT/EP2017/074646, filed on Sep. 28, 2017 and which claims benefit to Austrian Patent Application No. A50874/2016, filed on Sep. 28, 2016. The International Application was published in German on Apr. 5, 2018 as WO 2018/060339 A1 under PCT Article 21(2).

FIELD

The present invention relates to a method for producing an output data stream with at least partial interference suppression by detecting and selectively filtering a combustion chamber signal picked up at an internal combustion engine.

BACKGROUND

For analysis of combustion methods in internal combustion engines, it is known to pick up combustion chamber signals via sensors and to subsequently evaluate them. In measurements performed on internal combustion engines, however, it is nearly unavoidable that the combustion chamber signal is disturbed by interferences so that an interference suppression must be performed on the picked-up signal or on the data generated therefrom.

For analysis and optimization of the combustion methods of internal combustion engines and, as the case may be, also for control device calibration, it is customary, for example, to record the pressure developments in the interior of the cylinders via suited pressure pick-ups, charge amplifiers, and fast data acquisition systems. As a consequence of the not always ideal conditions for installation of the pressure sensors and due to external influences such as structure-borne noise signals or structure-borne noise vibrations as caused, for example, by the closing of valves, the measured pressure curve is afflicted by various disturbing influences which will affect the accuracy of the evaluations. It is known to subject the cylinder pressure signal to filtration for this reason.

Possible pulsating vibrations superimposed on the cylinder pressure as well as high pressure gradients such as those occurring in cases of pre-ignition, will, however, be filtered and thus be reduced in amplitude via such a filtration. Incorrect detection of such phenomena entails the danger that the engine may be overloaded and thus damaged. A reduction of the pressure gradient will also prevent a correct determination of combustion noise.

Since these phenomena occur in the range around the maximal pressure, one possibility to avoid the above mentioned side effects lies in not filtering the signal in a uniform manner across the entire crankshaft angle range.

It is known, for example, that the cylinder pressure signal can first be digitalized in a temporally synchronous manner, then transformed to an angular basis, and then smoothed by weighted averaging wherein, for this sliding averaging, the weight function as well as the window width can be varied via the crankshaft angle.

Since the above is a smoothing method that is applied on a signal which is transformed to a crankshaft angle, however, it will have the significant disadvantage of being ill-suited to indicate an exact filter characteristic line or an exact limiting frequency because the temporal distance between the crankshaft angle positions changes with the rotary speed.

According to a further known method, a crankshaft-dependent filtration of the cylinder pressure development is performed that is adapted to specific disturbance variables, wherein, however, the crankshaft information is in turn derived from the cylinder pressure curve. This has the disadvantage that the crankshaft information at a given point of time is known only approximately and that the current changes of the rotary speed caused by the individual cylinders are left entirely unconsidered.

Since the sample frequency on the time basis is normally considerably higher than on the crankshaft basis, the detected combustion chamber signal will lose information as a consequence of the angle-synchronous smoothing. The determination of the crankshaft position from an analysis of the cylinder pressure development is also massively restricted in its accuracy and is not useful for high-quality evaluation of data.

SUMMARY

An aspect of the present invention is to provide an improved method for at least partial interference suppression in a combustion chamber signal which overcomes the above-recited disadvantages. It is in particular an aspect of the present invention to allow for a high-quality evaluation of data of cylinder pressure signals measured in an indication system if the cylinder pressure signals are affected by interferences.

In an embodiment, the present invention provides a method for producing an output data stream with at least partial interference suppression by detecting and selectively filtering a combustion chamber signal picked up at an internal combustion engine. The method includes picking up the combustion chamber signal via a combustion chamber sensor and performing a temporally synchronized digitalization of the combustion chamber signal to produce a combustion chamber signal data stream. Simultaneously with the picking up of the combustion chamber signal, a crankshaft angle signal is picked up and a temporally synchronized digitalization of the crankshaft angle signal is performed to produce a crankshaft signal data stream. The combustion chamber signal data stream is split or duplicated the into a first combustion chamber signal data flow and a second combustion chamber signal data flow. The first combustion chamber signal data flow is filtered in a first filter to produce a first filtered combustion chamber signal data stream. The first filtered combustion chamber signal data stream is transformed from a time basis to a crankshaft angle basis using the crankshaft signal data stream to produce a first transformed combustion chamber signal data stream. The second combustion chamber signal data flow is transformed from a time basis to a crankshaft angle basis using the crankshaft signal data stream to produce a second transformed combustion chamber signal data stream. The first transformed combustion chamber signal data stream and the second transformed combustion chamber signal data stream are combined to produce an output data stream which comprises the first transformed combustion chamber signal data stream in a first crankshaft angle range and the second transformed combustion chamber signal data stream in a second crankshaft angle range.

BRIEF DESCRIPTION OF THE DRAWING

The present invention is described in greater detail below on the basis of embodiments and of the drawing in which:

The FIGURE shows a schematic representation of the process involved in a method for producing a combustion chamber signal data stream with interference suppression or at least partial interference suppression.

DETAILED DESCRIPTION

In an embodiment, the present invention provides a method for producing an output data stream with at least partial interference suppression by detecting and selectively filtering a combustion chamber signal picked up at an internal combustion engine, which comprises the following steps:

- picking up a combustion chamber signal by a combustion chamber sensor and producing a combustion chamber signal data stream by temporally synchronized digitalization of the combustion chamber signal,
- simultaneously picking up a crankshaft angle signal and producing a crankshaft signal data stream by temporally synchronized digitalization of the crankshaft angle signal,
- splitting or duplicating the combustion chamber signal data stream into a first combustion chamber signal data flow and a second combustion chamber signal data flow,
- producing a first filtered combustion chamber signal data stream by filtering the first combustion chamber signal data flow in a first filter,
- if appropriate, producing a second filtered combustion chamber signal data stream by filtering the second combustion chamber signal data flow in a second filter,
- producing a first transformed combustion chamber signal data stream by transforming the first filtered combustion chamber signal data stream from a time basis to a crankshaft angle basis by use of the picked-up crankshaft signal data stream, and producing a second transformed combustion chamber signal data stream by transforming the second, if appropriate filtered, combustion chamber signal data stream from a time basis to a crankshaft angle basis by use of the picked-up crankshaft signal data stream, and
- combining the transformed combustion chamber signal data streams so that the output data stream comprises the first transformed combustion chamber signal data stream in a first crankshaft angle range and the second transformed combustion chamber signal data stream in a second crankshaft angle range.

It can, for example, be provided that the first transformed combustion chamber signal data stream serves as a base signal and, between specific or selectable crankshaft angles, is replaced by the second transformed combustion chamber signal data stream.

It can, for example, be provided that the crankshaft angles between which the first transformed combustion chamber signal data stream is replaced by the second transformed combustion chamber signal data stream are freely selectable and/or that the first transformed combustion chamber signal data stream serves as a base signal and, between freely selectable crankshaft angles, values from the second transformed combustion chamber signal data stream are taken over into the base signal.

It can, for example, be provided that, prior to transformation to a crankshaft angle basis, the first combustion chamber signal data stream is filtered and/or numerically smoothed in a first filter, and/or that, prior to transformation to a crankshaft angle basis, the second combustion chamber signal data stream is filtered and/or numerically smoothed in a second filter.

It can, for example, be provided that, in the first crankshaft angle range, particularly in the low pressure part of the combustion method between 100° and 50° before the top dead center, a thermodynamic zero adjustment is performed.

It can, for example, be provided that the second crankshaft angle range comprises at least a part of the high pressure part or the entire high pressure part of the combustion method, and/or that the second crankshaft angle range comprises a range from 30° before the upper dead center of the high pressure part to 120° after the upper dead center of the high pressure part of the combustion method.

It can, for example, be provided that, in the transition range between the first crankshaft angle range and the second crankshaft angle range, the output data flow comprises a transition data flow or is formed by the transition data flow by which a steady and/or smooth transition is generated between the first transformed combustion chamber signal data stream and the second transformed combustion chamber signal data stream, wherein the transition data flow is formed by a crossfading function such as in particular a Gaussian integral curve or a linear function.

It can, for example, be provided that the first filter and the second filter can be parametrized independently from each other and freely.

It can, for example, be provided that the first filter is designed to perform, in the low pressure part of the combustion method, a basic smoothing of the combustion chamber signal or of the first combustion chamber signal data stream, and/or that the first filter is designed to filter relevant interferences such as mechanical interferences or structure-borne noise vibrations caused by the closing of the valves.

It can, for example, be provided that the second filter is designed to be able, in the high pressure part of the combustion method, to in particular filter interferences caused by the sensor mounting, but to allow passage of other vibrations such as, for example, pulsed vibrations.

It can, for example, be provided that the filter or the filters is/are designed as low-pass filters, bandpass filters, bandstop filters, or as filters for numerical smoothing.

It can, for example, be provided that the first filter is a low-pass filter or that the first filter is a low-pass filter having a limit frequency of 1 kHz to 5 kHz.

It can, for example, be provided that the second filter is a low-pass filter or that the second filter is a low-pass filter having a limit frequency of 20 kHz to 100 kHz.

It can, for example, be provided that the filter or the filters is/are designed to filter the respective combustion chamber signal data stream in real time.

It can, for example, be provided that the combustion chamber signal is a cylinder pressure signal of the combustion chamber or a pressure signal of a combustion chamber pressure sensor of an indexed motor.

It can, for example, be provided that the filtering times of the filtered combustion chamber signal data stream or of the filtered combustion chamber signal data streams are compensated, and/or that the transformation to a crankshaft angle basis and the transformation of the filtering times are performed in one step, in particular simultaneously.

It can, for example, be provided that the crankshaft angle signal corresponds to a crankshaft angle development which is picked up by a crankshaft angle pickup device.

It can, for example, be provided that the temporally synchronous digitalization is performed each time by an A/D converter, wherein the A/D converter is in particular an 18-bit converter having a sample rate of 2 MHz.

It can, for example, be provided that the filter or the filters are digital filter stages, in particular digital filter stages of the FIR type (Finite Impulse Response Filter).

It can, for example, be provided that the producing of the output data stream is performed in real time, in particular in real time but delayed by the filtering time to be compensated.

It can, for example, be provided that the producing of the output data stream is performed in real time, in particular in real time but delayed by the filtering time to be compensated, and that, for combining the transformed combustion chamber signal data streams into the output data stream, use is made of a digital signal processor or an FPGA ("Free Programmable Gate Array").

It can, for example, be provided that the method comprises the following steps:

- splitting or multiplying the combustion chamber signal data stream into a first combustion chamber signal data flow, in a second combustion chamber signal data flow, and in a third or further combustion chamber signal data flow,
- optionally, filtering the third or further combustion chamber signal data flow in a third or further filter,
- producing a third or further transformed combustion chamber signal data stream by transforming the third or further optionally filtered combustion chamber signal data stream from a time basis to a crankshaft angle basis by use of the picked-up crankshaft signal data stream, and
- combining the transformed combustion chamber signal data streams so that the output data stream is formed by the first transformed combustion chamber signal data stream in a first crankshaft angle range, by the second transformed combustion chamber signal data stream in a second crankshaft angle range, and by the third or further combustion chamber signal data stream in a third or further combustion chamber signal data stream.

It can, for example, be provided that the transition between the first transformed combustion chamber signal data stream (P1(phi)) and the values of at least one further transformed combustion chamber signal data stream (Pn (phi)) is defined by a freely adjustable crankshaft angle window (z), wherein the transition is performed according to the following rule:

phi<phi1: pr(phi)=p1(phi)

phi1<=phi<=phi1+z: pr(phi)=p1(phi)*(1−u(phi−phi1))+pn(phi)*u(phi−phi1)

phi1+z<phi<phin: pr(phi)=pn(phi)

phin<=phi<=phin+m: pr(phi)=pn(phi)*(1−u(phi−phin))+p1(phi)*(u(phi−phin))

phi>phin+m: pr(phi)=p1(phi), wherein phi is the crankshaft angle, phi1 is the first freely settable crankshaft angle, phin is a further freely settable crankshaft angle, p1(phi) is the first transformed combustion chamber signal data stream, pn(phi) is a further transformed combustion chamber signal data stream, u is the crossfading function forming the transition data stream, z is a first freely settable crankshaft angle window, m is a further freely settable crankshaft angle window, and pr is the output data stream.

In an embodiment, the present invention provides the use of a filter, in particular a digital filter, which can, for example, be applied only in a specific predefinable crankshaft angle range. The interfering vibrations caused by the closing of the valves are generated roughly in a range of 120° before the TDC (top dead center). For a thermodynamic zero adjustment which requires interference-free data, use is typically made of a range of 100° to 50° before the TDC. The maximum pressure gradient and pulsed vibrations, however, will occur only around the TDC and after it. It is thus advantageous to let the low-pass filter be effective only up to about 30° before the TDC and to then switch it off. The sudden deactivation of a filter, however, typically leads to irregularities in the signal development. To avoid such irregularities, a steady or sliding transition between the filtered signal and the unfiltered signal is provided. Use is thereby made of a so-called crossfading function (for example, a Gaussian integral curve), and a crankshaft range for the transition there defined:

If the pressure is given by the function p(phi)), and the low-pass-filtered pressure curve by pfilt(phi), and the crossfading function is given by u(x); wherein it is required that u(0)=0 and u(z)=1; there will thus apply, for the corrected pressure curve pk(phi):

For phi<phi1: pk(phi)=pfilt(phi)

For phi1<=phi<=phi1+z: pk(phi)=pfilt(phi)*(1−u(phi−phi1))+p(phi)*u(phi−phi1)

For phi>phi1+z: pk(phi)=p(phi).

In an embodiment, the present invention provides that the high-frequency data stream supplied by an A/D converter (for example, 18 Bits with a 2 MHz sample rate) can, for example, be conducted into two mutually independent digital filter stages (for example, of the FIR type) whose types and limiting frequencies can be freely defined by the end user of the measurement system. These can, for example, be low-pass filters or band-stop filters. The latter are of advantage, for example, in case that, in the high-pressure part of the cylinder pressure curve, there will occur narrow-band resonances dependent on the sensor mounting. Subsequent to these filtrations, the data are transformed to the crankshaft angle by use of the signals of a crankshaft angle pick-up device. In this step, the filtering times, which are unavoidable due to the real-time computation of the digital filters, will be considered and compensated so that the filters will cause no signal shifting over the crankshaft angle axis even in case of different rotary speeds. Subsequent thereto, the two generated crankshaft-angle-dependent filtered signal developments are again combined into a single development. As a basic pattern herein, use can, for example, be made of the curve filtered by the first filter, for example, the basic filter. Starting from a specific crankshaft angle phi1 which is freely definable by the user, the values of the second curve are taken over for the result signal and, starting from a further crankshaft angle phi2 which again is freely definable, the values from the first curve will again be taken over.

In order to avoid discontinuities at the transition sites, however, a sliding transition and not a hard switching can, for example, occur between the curve filtered by the first filter and the curve filtered by the second filter. A crossfading function (for example, a Gaussian integral curve) is used therefor, and there is defined a crankshaft angle window (n) for the transition:

If the pressure curve filtered by filter 1 is given by the function p1(phi) and the pressure curve filtered by filter 2 is given by the function p2(phi) and the crossfading function is given by u(x), wherein it is required that u(0)=0 and u(z)=1, the following applies for the resulting pressure curve pr(phi):

For phi<phi1: pr(phi)=p1(phi)

For phi1<=phi<=phi1+z: pr(phi)=p1(phi)*(1−u(phi−phi1))+p2(phi)*u(phi−phi1)

For phi1+z<phi<phi2: pr(phi)=p2(phi)

For phi2<=phi<=phi2+z: pr(phi)=p2(phi)*(1−u(phi−phi2))+p1(phi)*(u(phi−phi2))

For phi>phi2+z: pr(phi)=p1(phi).

Examples of a possible crossfading function u(phi) could, for example, be a linear function or a Gaussian integral curve.

The method for generating the filtered development of a cylinder pressure curve optionally comprises steps in which the digitalized pressure curve is passed through digital filter stages which can be freely parameterized in their type and limiting frequency and whose output developments will then be combined again into a resultant new pressure curve, wherein, before a definable crankshaft angle, there are used the values of the output development of the first filter, then the values of the output development of the second filter, and then again the values of the output development of the first filter.

It can, for example, be provided that a sliding switch-over between the output curves of the digital filters is performed with the aid of a crossfading function. The digital filtration, the transformation of the filtered data from a time basis to a crankshaft angle, and the combining of the output curves into a resulting crankshaft-angle-dependent development can, for example, here be performed in real time in a digital signal processor or FPGA ("Free Programmable Gate Array").

An exemplary embodiment of the present invention will be described in greater detail below with reference to the FIGURE.

Unless indicated otherwise, the reference numerals correspond to the following features: combustion chamber signal 1, combustion chamber signal data stream 2, crankshaft signal 3, crankshaft signal data stream 4, first filter 5, second filter 6, third filter 7, transformation (of the first combustion chamber signal data stream) 8, transformation (of the second combustion chamber signal data stream) 9, transformation (of the third combustion chamber signal data stream) 10, parameter 11, combining (of the output data stream) 12, disturbed signal 13, high-frequency change of the combustion chamber signal data stream at ignition 14, interference-suppressed output data flow 15, transition data stream 16, first crankshaft angle range 17, transition range 18, second crankshaft angle range 19, first transformed combustion chamber signal data stream 20, second transformed combustion chamber signal data stream 21, third transformed combustion chamber signal data stream 22, first filtered combustion chamber signal data stream 23, second optionally filtered combustion chamber signal data stream 24, third optionally filtered combustion chamber signal data stream 25, first combustion chamber signal data stream 26, second combustion chamber signal data stream 27, third combustion chamber signal data stream 28.

According to FIG. 1, in a first step, a combustion chamber signal 1 is picked up. This combustion chamber signal 1 can, for example, be a signal picked up via a pressure sensor, or another signal. Further possibilities are the output signal of a knock sensor or the output sensor of a temperature sensor. In the shown embodiment, the present invention is realized, by way of example, in connection with a pressure signal, in particular a pressure signal of the combustion chamber pressure sensor of an indexed motor.

The picked-up combustion chamber signal 1 is transformed to a combustion chamber signal data stream 2. This transformation is performed in particular by digitalizing, for example, by temporally synchronous digitalizing, for example, in an A/D converter.

At the same time, for example, via a crankshaft angle pick-up device, a crankshaft signal 3 is picked up and then is digitalized. This transformation of the crankshaft signal 3 to a crankshaft signal data stream 4 is carried out in particular by a temporally synchronous digitalizing with a high-frequency, for example, by scanning, counting and interpolating in an A/D converter.

For the further processing of the combustion chamber signal data stream 2, this stream is split and/or duplicated into a first combustion chamber signal data stream 26 and a second combustion chamber signal data stream 27. The splitting into a first combustion chamber signal data stream 26 and a second combustion chamber signal data stream 27 allows for an independent processing of the combustion chamber signal data stream in two different method steps. The first combustion chamber signal data stream 26 is thus filtered in a first filter 5 without influencing the second combustion chamber signal data stream 27 in the process.

The first filter can, for example, be a low-pass filter, a bandpass filter or a band-stop filter. In the shown embodiment, the first filter 5 is designed as a low-pass filter, for example, a low-pass filter having a limit frequency of 1 kHz to 5 kHz. The first filter 5 also serves for basis interference suppression. In the shown embodiment, the purpose of the first filter in particular resides in filtering the interferences of the combustion chamber signal 1 that are caused by the closing of the valves of the internal combustion motor. These are relatively high-frequent interferences which can be removed from the combustion chamber signal 1 or from the combustion chamber signal data stream 2 via the low-pass filter.

A transformation 8 of the first filtered combustion chamber signal data stream 23 from a time basis to a crankshaft angle basis is then performed, wherein the crankshaft signal data stream 4 used for this purpose is the data of the crankshaft signal 3. According to the shown embodiment, the equalization of the filtering times will also take place during the transformation 8. These filtering times are in particular caused by the real-time computation of the (particularly digital) filters. No signal shifts will occur over the crankshaft angle axis also in case of different rotary speeds via this equalization.

In an embodiment, the second combustion chamber signal data stream 27 can also be filtered and/or numerically smoothed in a second filter 6. This filtering or smoothing in the second filter 6 can, for example, be performed in parallel and thus independently from the filtration of the first combustion chamber signal data stream 26 in the first filter 5. In an embodiment, the second combustion chamber signal data stream 27 can also optionally be passed on without filtration. In the shown embodiment, the second filter 6 is designed as a low-pass filter, in particular a low-pass filter having a limit frequency of 20 kHz to 100 kHz. The second filter 6 also serves for possible additional interference suppression.

A transformation 9 of the second optionally filtered combustion chamber signal data stream 24 from a time basis to a crankshaft angle basis is then performed. The equalization of the filtering times can, for example, also be performed in the transformation 9.

The same is performed during the transformation 8 of the first filtered combustion chamber signal data stream 23 from a time base to a crankshaft angle base.

If required, a third optionally filtered combustion chamber signal data stream 25 is provided which is produced by filtration of a third combustion chamber signal data stream 28 in a third filter 7. This third optionally filtered combustion chamber signal data stream 25 is also transformed, in a transformation 10, from a time base to a crankshaft angle base. The equalization of the filtering times can, for example, also be performed in the transformation 10.

In a further step, an output data flow 15 is formed via combining 12. According to the shown embodiment, this output data flow comprises parts or a part of the first transformed combustion chamber signal data stream 20 and the second transformed combustion chamber signal data stream 21. The output data flow 15 in particular comprises at least a part of the first transformed combustion chamber signal data stream 20 and at least a part of the second transformed combustion chamber signal data stream 21. According to the method of the present invention, there is provided a first crankshaft angle range 17 in which the output data flow 15 corresponds to the first transformed combustion chamber signal data stream 20. A second crankshaft angle range 19 is further provided in which the output data flow 15 corresponds to the second transformed combustion chamber signal data stream 21. The first crankshaft angle range 17 can, for example, comprise that range where an interference occurs which must be filtered or eliminated. In the present case, the first crankshaft angle range 17 comprises the low-pressure part of the combustion method and that range where the valves of the corresponding cylinder of the internal combustion engine are closed. According to the present method, the disturbed signal 13, which is shown merely to facilitate understanding, is replaced by the first transformed combustion chamber signal data stream 20 which has been filtered in the first filter 5, so that interferences will be eliminated and the output data flow 15 will be, or have been, interference-suppressed. In the second crankshaft angle range 19, on the other hand, the output data flow 15 is formed by the second transformed combustion chamber signal data stream 21 which also reproduces high-frequency changes of the combustion chamber signal data stream caused by pulsed combustion, and/or possible interferences caused by the sensor mounting. The second crankshaft angle range 19 comprises the high-pressure part of the combustion method in the present case.

A different filtering or smoothing is performed in dependence on the crankshaft angle range as a result of the above combining 12, wherein the crankshaft angle ranges can be determined or selected by parameters 11.

For avoidance of discontinuities in the output data flow 15, a transition range 18 with a transition data stream 16 is arranged between two lined-up transformed combustion chamber signal data streams 20, 21. The transition data stream 16 is in particular suited or designed to bring about a steady development of the output data flow 15 between the two lined-up transformed combustion chamber signal data streams 20, 21. The transition data stream 16 can, for example, be a Gaussian integral curve whose boundary conditions correspond to the boundary conditions of the lined-up combustion chamber signal data streams.

In all embodiments, it can be provided that the filters are designed to filter and/or numerically smoothen the combustion chamber signal data streams in a filter prior to transformation to a crankshaft angle basis.

In all embodiments, it can be provided that the first transformed combustion chamber signal data stream corresponds to a first filtered and/or smoothed and transformed combustion chamber signal data stream.

In all embodiments, it can be provided that the second, third and further transformed combustion chamber signal data streams corresponds to a second, third and further optionally filtered and/or optionally smoothed and transformed combustion chamber signal data stream.

In all embodiments, it can be provided that the high-pressure part of the combustion method corresponds to the high-pressure range of the combustion method.

In all embodiments, it can be provided that the low-pressure part of the combustion method corresponds to the low-pressure range of the combustion method.

In all embodiments, it can be provided that the output data stream is formed, in a first crankshaft angle range, by the first transformed combustion chamber signal data stream and, in a second crankshaft angle range, by the second transformed combustion chamber signal data stream.

In an embodiment of the method, the present invention provides that the combustion chamber signal data stream can, for example, be split or multiplied into two, three, four, five, six or more combustion chamber signal data streams.

In an embodiment of the method, the present invention provides that the first, second, third, fourth, fifth, sixth or further combustion chamber signal data streams that have been split or multiplied from the combustion chamber signal data stream can, for example, be filtered or smoothed in an associated first, second, third, fourth, fifth, sixth or further filter.

In an embodiment of the method, the present invention provides that the filtered or optionally filtered first, second, third, fourth, fifth, sixth or further combustion chamber signal data streams can, for example, be transformed from a time basis to a crankshaft angle basis in an associated first, second, third, fourth, fifth, sixth or further transformation.

In an embodiment of the method, the present invention provides that the output data stream can, for example, comprise parts or a part of a first, second, third, fourth, fifth, sixth or further transformed combustion chamber signal data stream or is generated thereby.

The present invention is not limited to embodiments described herein; reference should be had to the appended claims.

What is claimed is:

1. A method for producing an output data stream with at least partial interference suppression by detecting and selectively filtering a combustion chamber signal picked up at an internal combustion engine, the method comprising:

picking up the combustion chamber signal via a combustion chamber sensor and performing a temporally synchronized digitalization of the combustion chamber signal to produce a combustion chamber signal data stream;

simultaneously with the picking up of the combustion chamber signal, picking up a crankshaft angle signal and performing a temporally synchronized digitalization of the crankshaft angle signal to produce a crankshaft signal data stream;

splitting or duplicating the combustion chamber signal data stream into a first combustion chamber signal data flow and a second combustion chamber signal data flow;

filtering the first combustion chamber signal data flow in a first filter to produce a first filtered combustion chamber signal data stream;

transforming the first filtered combustion chamber signal data stream from a time basis to a crankshaft angle basis using the crankshaft signal data stream to produce a first transformed combustion chamber signal data stream;

transforming the second combustion chamber signal data flow from a time basis to a crankshaft angle basis using the crankshaft signal data stream to produce a second transformed combustion chamber signal data stream;

combining first transformed combustion chamber signal data stream and the second transformed combustion chamber signal data stream to produce an output data stream which comprises the first transformed combustion chamber signal data stream in a first crankshaft angle range and the second transformed combustion chamber signal data stream in a second crankshaft angle range.

2. The method as recited in claim 1, wherein, prior to being transformed, the second combustion chamber signal data flow is filtered in a second filter to a second filtered combustion chamber signal data stream, which second filtered combustion chamber signal data stream is then transformed.

3. The method as recited in claim 1, wherein the first transformed combustion chamber signal data stream serves as a base signal and is replaced by the second transformed combustion chamber signal data stream between crankshaft angles which are specific or selectable.

4. The method as recited in claim 3, wherein at least one of:

the crankshaft angles between which the first transformed combustion chamber signal data stream is replaced by the second transformed combustion chamber signal data stream are selectable, and the first transformed combustion chamber signal data stream serves as the base signal and values from the second transformed combustion chamber signal data stream are taken over into the base signal between the crankshaft angles which are selectable.

5. The method as recited in claim 1, wherein at least one of:

prior to the transforming of the first filtered combustion chamber signal data stream from the time basis to the crankshaft angle basis, the first combustion chamber signal data stream is at least one of filtered and numerically smoothed in the first filter, and prior to the transforming of the second combustion chamber signal data flow from the time basis to the crankshaft angle basis, the second combustion chamber signal data stream is at least one of filtered and numerically smoothed in a second filter.

6. The method as recited in claim 1, further comprising:

performing a thermodynamic zero adjustment in the first crankshaft angle range.

7. The method as recited in claim 6, wherein the first crankshaft angle range is a low pressure part of a combustion method between 100° and 50° before a top dead center.

8. The method as recited in claim 1, wherein at least one of, the second crankshaft angle range comprises at least a part of a high pressure part of a combustion method or an entire high pressure part of the combustion method, and the second crankshaft angle range comprises a range of from 30° before an upper dead center to 120° after the upper dead center of the high pressure part of the combustion method.

9. The method as recited in claim 1, wherein, in a transition range between the first crankshaft angle range and the second crankshaft angle range, the output data stream comprises a transition data flow or is formed by the transition data flow via which at least one of a steady transition and a smooth transition is generated between the first transformed combustion chamber signal data stream and the second transformed combustion chamber signal data stream, and the transition data flow is formed by a crossfading function.

10. The method as recited in claim 9, wherein the crossfading function is a Gaussian integral curve or a linear function.

11. The method as recited in claim 2, wherein at least one of:

the first filter is designed to perform, in a low pressure part of a combustion method, a basic smoothing of the combustion chamber signal or of the first combustion chamber signal data stream 26, and the first filter is designed to filter interferences caused by a closing of valves of the internal combustion engine.

12. The method as recited in claim 11, wherein the second filter is designed to be able, in a high pressure part of the combustion method, to filter interferences caused by a sensor mounting but to allow a passage of other vibrations which includes pulsed vibrations.

13. The method as recited in claim 12, wherein at least one of:

the first filter is a low-pass filter with a limit frequency of 1 kHz to 5 kHz, and the second filter is a low-pass filter with a limit frequency of 20 kHz to 100 kHz.

14. The method as recited in claim 13, wherein, the first filter is configured to filter the first combustion chamber signal data flow in real time, the second filter is configured to filter the second combustion chamber signal data flow in real time.

15. The method as recited in claim 1, wherein the combustion chamber signal is a cylinder pressure signal of a combustion chamber or a signal of a combustion chamber pressure sensor of an indexed motor.

16. The method as recited in claim 15, wherein at least one of, a filtering time of the first filtered combustion chamber signal data stream or a filtering time of the second combustion chamber signal data flow are compensated, and the transforming the first filtered combustion chamber signal data stream from the time basis to the crankshaft angle and the transforming the second combustion chamber signal data flow from the time basis to the crankshaft angle basis is performed simultaneously.

17. The method as recited in claim 1, wherein the crankshaft angle signal corresponds to a crankshaft angle development which is picked up by a crankshaft angle pickup device.

18. The method as recited in claim 1, wherein, each temporally synchronized digitalization is performed by an A/D converter, and the A/D converter is an 18-bit converter with a sample rate of 2 MHz.

19. The method as recited in claim 2, wherein at least one of:

the first filter is a digital filter stage of an FIR type (Finite Impulse Response Filter), and the second filter is a digital filter stage of an FIR type (Finite Impulse Response Filter).

20. The method as recited in claim 1, wherein the producing of the output data stream is performed in real time as delayed by a filtering time to be compensated.

21. The method as recited in claim 1, wherein, the producing of the output data stream is performed in real time as delayed by a filtering time to be compensated, and a digital signal processor or an FPGA (Free Programmable Gate Array) is used to combine the first transformed combustion chamber signal data stream and the second transformed combustion chamber signal data stream into the output data stream.

22. The method as recited in claim 1, further comprising:

multiplying the combustion chamber signal data stream into the first combustion chamber signal data flow, into the second combustion chamber signal data flow, and into at least one further combustion chamber signal data flow;

transforming the at least one third combustion chamber signal data flow from a time basis to a crankshaft angle basis using the crankshaft signal data stream to produce at least one third transformed combustion chamber signal data stream;

combining first transformed combustion chamber signal data stream, the second transformed combustion chamber signal data stream and the at least one further transformed combustion chamber signal data stream to produce the output data stream which comprises the first transformed combustion chamber signal data stream in the first crankshaft angle range, the second transformed combustion chamber signal data stream in the second crankshaft angle range, and the at least one further transformed combustion chamber signal data stream in an at least one further crankshaft angle range.

23. The method as recited in claim 22, wherein, prior to being transformed, the at least one further combustion chamber signal data flow filtered in a third filter to an at least one further filtered combustion chamber signal data stream, which at least one further filtered combustion chamber signal data stream is then transformed.

24. The method as recited in claim 22, wherein, an adjustable crankshaft angle window is defined for the transition between, the first transformed combustion chamber signal data stream (P1(phi)) and values of at least one of the second transformed combustion chamber signal data stream and the at least one further transformed combustion chamber signal data stream (Pn(phi)), wherein, the transition is performed according to the following rule:

phi<phi1: pr(phi)=p1(phi)

phi1<=phi<=phi1+z: pr(phi)=p1(phi)*(1−u(phi−phi1))+pn(phi)*u(phi−phi1)

phi1+z<phi<phin: pr(phi)=pn(phi)

phin<=phi<=phin+m: pr(phi)=pn(phi)*(1−u(phi−phin))+p1(phi)*(u(phi−phin))

phi>phin+m: pr(phi)=p1(phi)

and wherein, phi is a crankshaft angle, phi1 is a first freely settable crankshaft angle, phin is a further freely settable crankshaft angle, p1(phi) is the first transformed combustion chamber signal data stream, pn(phi) is at least one of the second transformed combustion chamber signal data stream and the at least one further transformed combustion chamber signal data stream, u is a crossfading function forming a transition data stream, z is a first freely settable crankshaft angle window, m is a further freely settable crankshaft angle window, and pr is the output data stream.

* * * * *